United States Patent [19]

Bogatirev et al.

[11] 4,113,287
[45] Sep. 12, 1978

[54] END FITTING FOR MULTI-CHANNEL HOSE

[75] Inventors: Nikolai Tikhonovich Bogatirev; Jevgeny Grigorievich Filianovich; Alexandr Dmitrievich Ignatyev; Alexandr Nikolaevich Merkulov; Jury Filippovich Ponomarenko; Jury Gheorghievich Shein, all of Moscow, U.S.S.R.; József Basó, Budapest, Hungary; Béla Frituz, Budapest, Hungary; József Korbuly, Budapest, Hungary; Sándor Nagy, Budapest, Hungary; Sándor Mikes, Szeged, Hungary; Zsolt Pap, Budapest, Hungary

[73] Assignees: Banyaszati Kutato Intezet, Budapest, Hungary; Skotchinksy Institut Gornogo Dela, Moscow, U.S.S.R.; Taurus Gumiipari Vallalat, Budapest, Hungary

[21] Appl. No.: 787,511

[22] Filed: Apr. 14, 1977

[51] Int. Cl.² .............................................. F16L 39/00
[52] U.S. Cl. .............................. 285/137 R; 285/321; 285/305
[58] Field of Search .................... 285/137 R, 321, 305

[56] References Cited

U.S. PATENT DOCUMENTS 3,889,986  6/1975  Cheshir et al. ................. 285/137 R

FOREIGN PATENT DOCUMENTS 652,395    9/1964  Belgium ............................. 285/137 R
1,005,793  4/1957  Fed. Rep. of Germany ...... 285/137 R Primary Examiner—Werner H. Schroeder
Assistant Examiner—C. J. Arbes

[57] ABSTRACT

End fitting or armature for multi-channel hoses having a positioning plate and a guiding plate extending perpendicularly to the longitudinal axis of the hose and apertured to receive hose coupling elements. Means are provided for varying the axial spacing of the plates. A resilient element is disposed between the plates, a part of which seats in a groove formed in the internal surface of the end fitting when the plates are pulled towards each other under load.

5 Claims, 4 Drawing Figures

END FITTING FOR MULTI-CHANNEL HOSE

BACKGROUND OF THE INVENTION

1. Field of the Invention

The invention concerns an end fitting or armature for multi-channel hoses, especially for a multi-channel hose serving to convey high-pressure media.

2. Description of the Prior Art

End fittings for multi-channel hoses are known which contain means suitable for accommodating and positioning coupling elements for the individual hoses, these means consisting of a positioning member and a guiding plate respectively extending perpendicularly to the longitudinal axes of the individual hoses and provided with apertures for receiving the hose coupling elements (see e.g. Soviet Pat. No. 306,309).

In the construction according to the just mentioned Soviet Patent the positioning member and the guiding plate are supported and secured in the interior of the end fitting by a coil spring from the inside, and from outside by a resilient spring snapped into an annular peripheral groove formed in the internal surface of the body of the end fitting. The positioning member forms a piston-cylinder system with the internal surface of the end-fitting body. The outer surface of the positioning member is provided with suitable sealing means, and the space closed thereby communicates with a source of pressurised fluid medium by way of a separate channel. The pressurised fluid medium assists in pressing the positioning member and the guiding plate towards each other and to a counterpiece coupled to the end fitting.

This known construction has several drawbacks. It is very complicated. It requires a separate source of pressurised medium, and one of the channels has to be taken up with conveying the pressure medium. For a piston-like operation the co-operating surfaces have to be machined accurately, and adequate sealing must be provided. In the event of a fault in the end fitting, the necessary dismantling is very cumbersome and during this work the groove receiving the resilient ring can easily damage the sealing element. Under conditions prevailing in mines, contamination of the co-operating (engaging) surfaces also represents a problem.

SUMMARY OF THE INVENTION

One object of the invention is to eliminate or reduce the above-mentioned drawbacks.

Accordingly, an object of the invention is to provide end fittings for a multi-channel hose wherein the positioning of the coupling elements of the individual hose members and their securing relative to the body of the fitting can take place in a considerably simpler yet a more reliable fashion.

The above object is achieved by providing an end fitting (armature) with a member suitable for varying the axial distance between the positioning and guiding plates, expediently a screw holding these plates together, and with a preferably resilient spacing element disposed between these plates, and wherein at least a part of the spacing element is farther from the longitudinal axis of the end fitting when the plates are pulled together than in the unloaded state.

In a preferred embodiment of the end fitting according to the invention the part of the resilient spacing element is disposed in a groove-expediently an annular groove - formed in the internal surface of the end-fitting body, when the positioning and the guiding plates are pulled together.

In a further advantageous embodiment of the end fitting according to the invention there is a respective peripheral inclined break or chamfer, and the resilient spacing element is constituted by a ring disposed in the pulled - together state of the positioning and guiding plates in a space bounded by a - preferably annular - groove formed in the internal surface of the end-fitting body and the two chamfered surfaces, the ring being expediently made of metal, e.g. steel, and being possibly split at one location.

In another advantageous embodiment, the spacing element is a block made of a resilient material, expediently rubber which, in the unloaded state, has a major cross-section perpendicular to the longitudinal axis of the end fitting. The cross-section is preferably smaller than, and in the pulled-together state of the plates larger than, the cross-section of the body interior at the open face of the internal cavity of the end fitting.

The end fitting embodied in the invention is very simple, robustly constructed, not prone to breakdown and therefore may with advantage be used e.g. in mining.

BRIEF DESCRIPTION OF THE DRAWINGS

The invention is described by way of example only with reference to the accompanying drawings, wherein.

DESCRIPTION OF THE PREFERRED EMBODIMENTS

Figure 1:
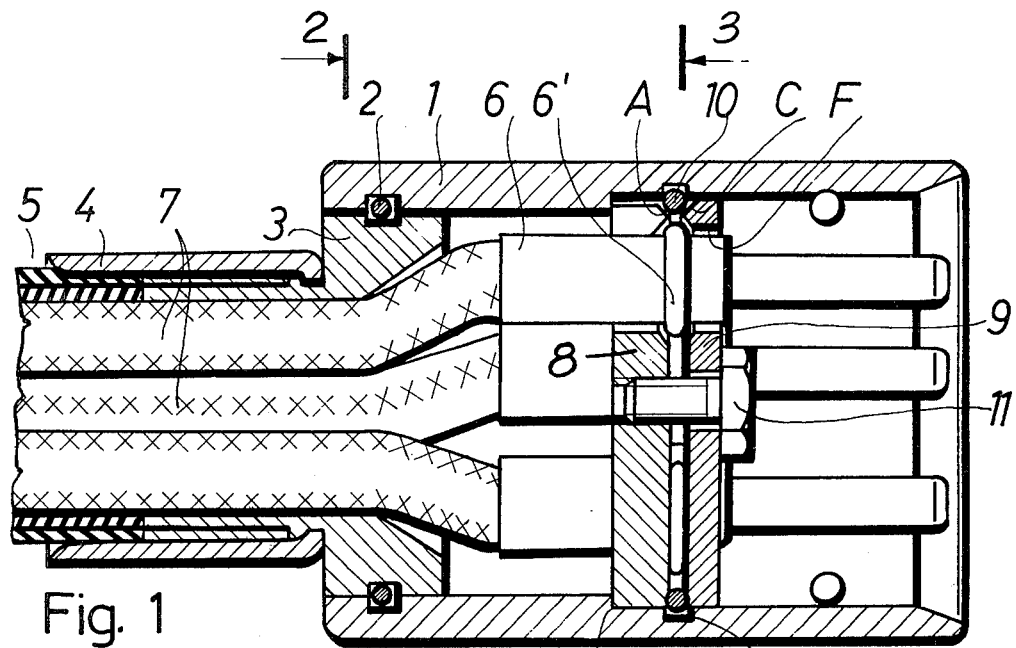
FIG. 1 is a longitudinal cross-section of an end fitting according to the invention, wherein the spacing element is a steel ring.
Figures 2, 3:
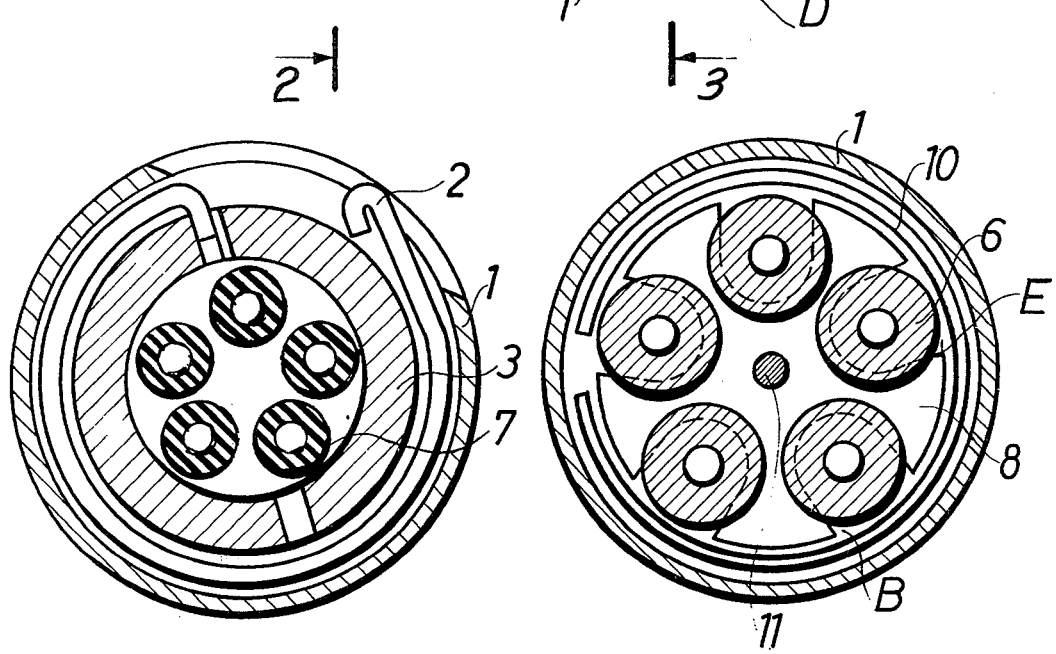
FIG. 2 is a section taken along the plane 2—2 of FIG. 1.
FIG. 3 is a section taken along the plane 3—3 of FIG. 1.

The end fitting according to FIGS. 1 to 3 has a hollow cylindrical body 1, one end of which is open while its other end is coupled by way of a wire ring 2 (See FIG. 2) to a coupling member or flange 3. A protective jacket 5 is connected to the coupling member 3 via a sleeve 4 and contains within it several (here five) individual hose elements 7. The ends of the hose elements 7 projecting into the interior of body 1 are provided with conventional cylindrical coupling elements 6 which latter consist of two sections of unequal diameter. An annular collar 6' is provided on the larger diameter section. Proceeding along the internal surface of the body 1 towards the open end there is provided a shoulder 1' and an annular groove D formed in the internal surface of the body 1. A positioning plate or disc 8 bears against the shoulder 1' and is provided with recesses or notches E for the coupling elements 6 of the hose elements 7 (FIG. 3). On the side of the plate 8 facing the open end of the body 1 peripheral inclined or chamfered surfaces A are provided.

In parallel with the positioning plate 8 a guiding plate or disc 9 is disposed in the body and is provided with bores F for the coupling elements 6. The opposite or mutually facing surfaces of bores F and notches E are grooved to receive and engage the collars 6' of the coupling elements 6. The guiding plate 9 has a peripheral inclined surface or chamfer C on its side facing the closed end of the body 1. In the space bounded by the annular groove D and the chamfers A and C there is a preferably resilient spacing element in the form of a ring 10 preferably split at one place and made expediently of steel.

The positioning plate 8 has a central, axial threaded bore while the guiding plate 9 has a similar bore which is of somewhat greater diameter than that of the bore in the plate 8. A screw 11 is passed through the bores and engages the threads of the bore in the positioning plate 8. Thus the axial distance between the positioning plate 8 and the guiding plate 9 varies according to the adjustment of the screw 11.

The spacing ring 10 is so formed that in the unstressed state its diameter is smaller than the internal diameter of the body 1, while after the positioning plate 8 and the guiding plate 9 have been pulled (screwed) together, the ring 10 opens and enters into the groove D, thus reliably securing the two plates. Thus after tightening the screw 11 the plates will be tightly engaged with each other, with the coupling elements 6 as well as with the body 1, while at the same time the coupling elements 6 take up their desired positions and direction.

FIG. 2 shows in greater detail a possible simple mode of connecting the body 1 and the coupling member 3.

Figure 4:
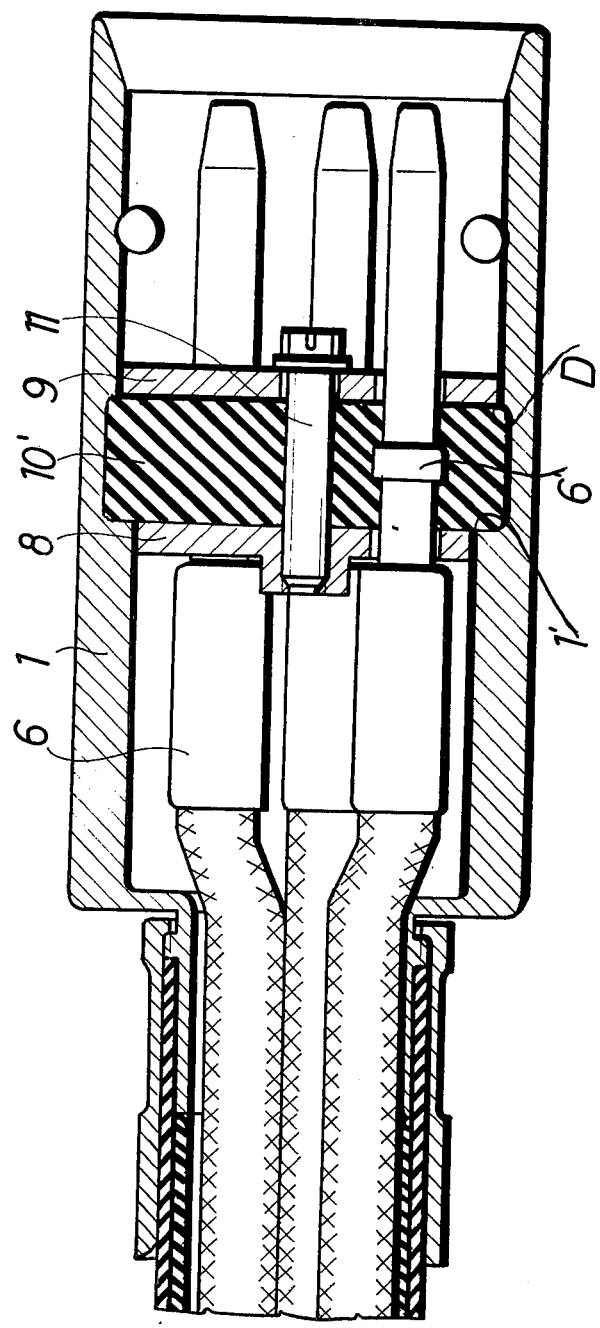
FIG. 4 is a variant of FIG. 1 wherein the spacing element is a resilient rubber block.

FIG. 4 shows an alternative embodiment wherein there are no chamfers at the peripheral surfaces of the positioning plate 8 and the guiding plate 9, and the spacing element between these plates is a block 10' of resilient material, e.g. rubber, provided with bores for the coupling elements 6. In the unstressed state the greatest cross-section of the block 10' at right angles to the longitudinal axis of the body 1 is preferably smaller than the cross-section of the internal cavity of the body 1 at its open face. After the plates 8 and 9 have been pulled together by means of the screw 11, the edges of the block 10' penetrate into the annular groove D (the groove here being naturally wider than in the FIGS. 1 - 3 embodiment), and provide a reliable connection.

The collars 6' formed on the coupling elements 6 contribute to the fastening because the bores of the spacing block 10' are clamped thereon as the diameter of these bores diminishes on tightening the screw 11.

The invention is not restricted to the illustrated preferred embodiments. The end fitting may for instance be of rectangular rather than circular cross-section, in which case, of course, all the other elements are shaped appropriately.

What is claimed is:

1. An end fitting for a multi-channel hose, comprising a hollow body for positioning and retaining coupling elements of individual hoses; a positioning plate and a guiding plate respectively disposed within said body, at right angles to the longitudinal axis of the end fitting; respective apertures defined in said plates for receiving said coupling elements; adjusting means for varying the axial distance between said plates; and means disposed between said plates for resiliently spacing them apart, at least a part of said spacing means being farther from the longitudinal axis, when said plates are pulled towards each other under load, than in an unloaded state; wherein a groove is defined in the internal surface of said body, and said part of the spacing means is engaged in said groove when said plates are pulled towards each other.

2. The end fitting as defined in claim 1, wherein said adjusting means is in the form of a screw engaging said plates.

3. The end fitting as defined in claim 1, wherein said spacing means is constituted by a resilient block, the major cross-section of which is perpendicular to the longitudinal axis.

4. The end fitting as defined in claim 1, wherein facing surfaces of said plates are provided with respective peripheral chamfers, and said spacing means is constituted by an at least partly resilient ring disposed in a space defined and bounded by said groove and said chamfers when said plates are pulled towards each other.

5. The end fitting as defined in claim 4, wherein said ring is a split metallic ring.

* * * * *